United States Patent [19]

Muurinen

[11] Patent Number: 5,408,060
[45] Date of Patent: Apr. 18, 1995

[54] ILLUMINATED PUSHBUTTON KEYBOARD

[75] Inventor: Jari Muurinen, Pernio, Finland

[73] Assignee: Nokia Mobile Phones Ltd., Salo, Finland

[21] Appl. No.: 267,855

[22] Filed: Jun. 29, 1994

Related U.S. Application Data

[63] Continuation of Ser. No. 826,990, Jan. 28, 1992, abandoned.

[30] Foreign Application Priority Data

Jan. 29, 1991 [FI] Finland .................................. 910419

[51] Int. Cl.⁶ .......................... H01H 9/00; H01H 9/16
[52] U.S. Cl. ..................................... 200/314; 200/310; 200/311; 200/312; 200/DIG. 47
[58] Field of Search ............... 200/310, 311, 312, 313, 200/314, 315, 316, DIG. 47; 341/23; 340/762, 781, 782

[56] References Cited

U.S. PATENT DOCUMENTS

| | | | |
|---|---|---|---|
| 4,131,777 | 12/1978 | Bailey et al. | 200/311 |
| 4,454,501 | 9/1984 | Butts | 340/365 R |
| 4,489,310 | 12/1984 | Trostyanetsky | 340/365 VC |
| 4,987,279 | 1/1991 | Hirose et al. | 200/314 |
| 5,012,054 | 4/1991 | Rada et al. | 200/DIG. 47 X |
| 5,107,082 | 4/1992 | Valenzona | 200/315 X |
| 5,239,152 | 8/1993 | Caldwell et al. | 200/5 R X |

FOREIGN PATENT DOCUMENTS

| | | |
|---|---|---|
| 024620 | 2/1990 | European Pat. Off. . |
| 3835895A1 | 2/1983 | Germany . |
| 3235752.4 | 3/1984 | Germany . |
| 3139501C1 | 6/1984 | Germany . |
| 3416828A1 | 11/1985 | Germany . |
| 279233 | 8/1988 | Germany . |
| 2153078 | 8/1985 | United Kingdom .......... 341/23 |
| 2154393 | 9/1985 | United Kingdom . |

OTHER PUBLICATIONS

English translation of abstract for German reference DE 3235752.
Hoevel et al., IBM Technical Disclosure, vol. 26, No. 9, Feb. 1984, "Keyboard with Optically Changeable Key Symbols".
Boehm, IBM Technical Disclosure, vol. 22, No. 4, Sep. 1979, "Changeable Character Display Keyboard".

*Primary Examiner*—Ernest G. Cusick
*Attorney, Agent, or Firm*—Perman & Green

[57] ABSTRACT

An illuminated keyboard in which the keys are operable in at least two different modes. Each key is provided with symbols or areas of color which denote the different modes. The symbols or areas are selectively illuminated depending upon which mode is selected. Thus, in one mode, one area of the keys will be illuminated, while in another mode, another area of the keys will be illuminated. Thus, only the symbols or areas of color on denoting a selected mode are differentially visibly distinguishable by the user, assisting the user to press the correct key, in any selected mode.

17 Claims, 4 Drawing Sheets

ILLUMINATED PUSHBUTTON KEYBOARD

This is a continuation of application Ser. No. 07/826,990 filed on Jan. 28, 1992, now abandoned.

The invention concerns an internally illuminated pushbutton keyboard, comprising an individual pushbutton or an array of several pushbuttons in which each pushbutton can be operable to select at least two different functions by pressing the pushbutton and in which the alternative pushbutton functions are indicated on the pushbutton or adjacent thereto, distinguished from one another, and are selectable by means of a separate function key, or as a result of a logical operation using the pushbutton keyboard, such that the mode of operation of the pushbutton or of the entire pushbutton array switches from one mode to another. The invention concerns preferably an illuminated pushbutton keyboard for radio telephone or the like, in which one mode of operation conventionally refers to the keying in of numbers and other functions, and the other to the keying in of letters.

It is highly traditional in the art, for example both in radio telephones, pocket calculators, and in computers to employ one pushbutton for a number of operations. This usually takes place so that when a function key is pressed, the mode of operation of one, some or all of the pushbuttons change. The different modes of operation of each pushbutton are indicated close to the pushbutton, that is by providing symbols denoting the respective functions in each different mode of operation selectable by each action of the function key and which are distinguishable from each other by means of either their location, e.g. above, on, or below the pushbutton, or by the colour of the pushbutton. In addition, the on/off switch mode of the function key is indicated either with a separate symbol in the keyboard, as usual in calculators, or with a signal light in the pushbutton keyboard, indicating the active function key, as is common in computers. In addition, the pushbutton functions can be changed using the programming function of the device as, for instance, in word processing.

The essential feature in all such designs is that all conceivable pushbutton operations are simultaneously visible to the user. This gives rise to a problem that distinguishing the desired pushbutton operation is difficult and requires the user to pay additional attention either to the location of the indicating symbol or to the colour. Finding the desired pushbutton operation is particularly difficult in the dark, for example, with a radio telephone, when the keyboard is viewed with the aid of pushbutton illumination. Since the pushbutton illumination is relatively poor, locating one symbol among a great variety of symbols is difficult and distinguishing colour is questionable. Distinguishing the colours corresponding to the different modes of operation of the pushbutton of a mains-connected device, or of a device used in bright electrical light if there is not enough natural light, is not usually a problem because, in that case, sufficient general illumination is present or can be easily provided because power consumption is not critical. However with portable devices used in darkness or in poor light without any external power source, sufficient general illumination cannot be provided because the power consumption would be too high.

According to the present invention there is provided an illuminated keyboard comprising one or more keys operable in at least two different modes having associated therewith means for indicating the respective different functions characterised in that, in each mode the respective indicating means associated with a mode is visibly distinguishable by a user when operating in that mode. This has the advantage that, at any one moment one is able to see, for each pushbutton, primarily only the symbol denoting the current function of each pushbutton. An advantage of the invention is also that the different functions of the pushbuttons are distinguishable in this manner when there are many functions for each key, even if the modes are selected sequentially by a function key.

Preferably, the associated indicating means comprises an illuminated region of the key, a separate region being illuminated for each selected mode. The internal illumination may be provided by a light emitting diode, which has the advantage of having low power consumption, which is ideal for portable devices.

Preferably, each separate region is coloured, the colour of which corresponds to the colour of the light transmittable by that region. This has the advantage that, the symbols denoting-different functions are distinguishable also in general illumination when the internal illumination is not switched on.

The invention will be described, by way of example only, with reference to the accompanying drawings, which:

Figure 7:
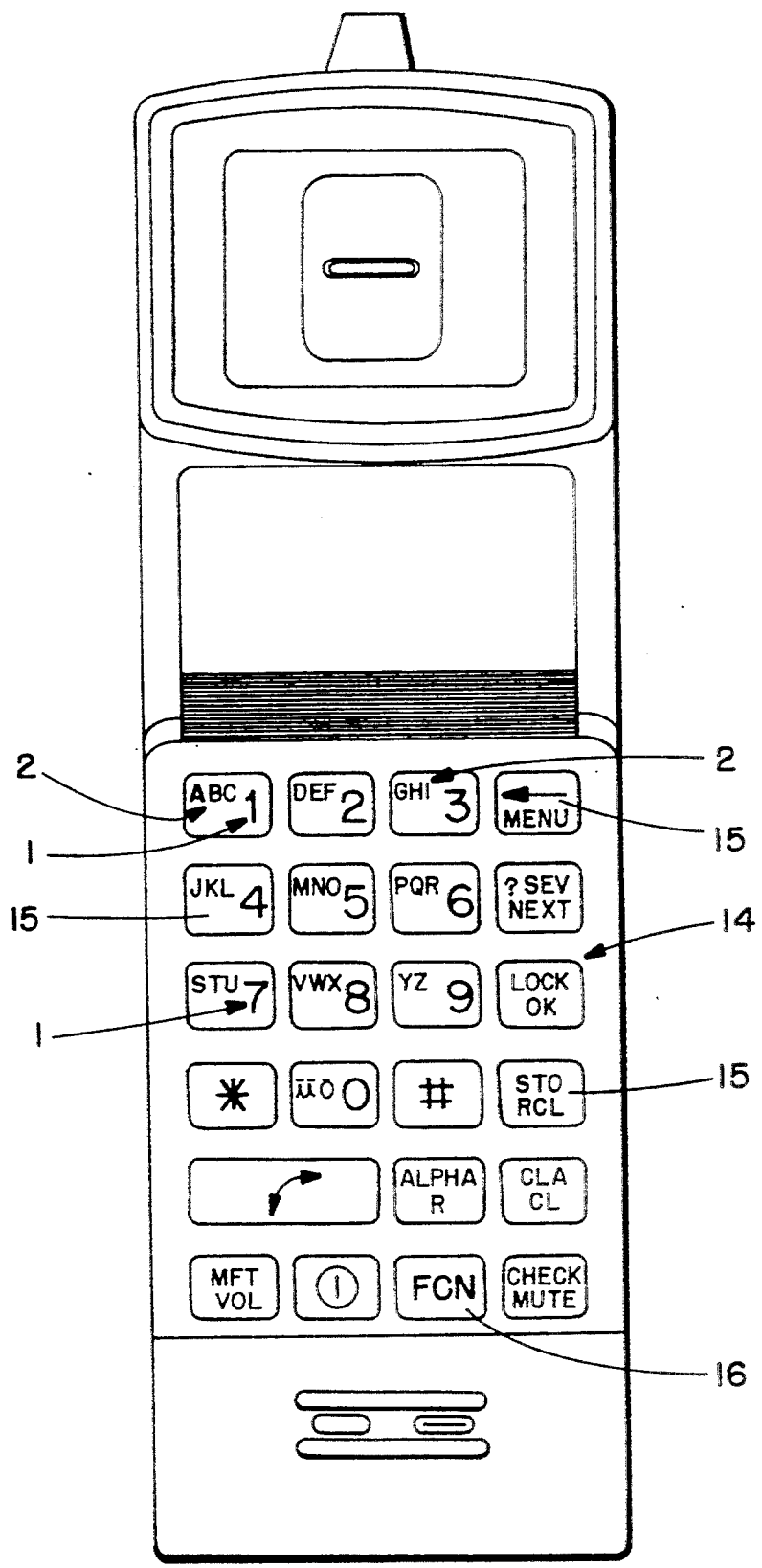
FIG. 7 shows a portable radio telephone incorporating pushbutton keyboard of the invention.

The pushbutton keyboard 14 of a device, for example, a portable radio telephone, may comprise one or more internally illuminated pushbuttons 15 each pushbutton having symbols thereon designed to indicate the functions of the pushbutton 15 as illustrated in FIG. 7. The pushbuttons 9,8 shown in FIGS. 1 and 2 operate in two pushbutton modes of operation having a different function in each mode, whereby the first mode of operation is indicated by an alphabetic character "A" and the second mode of operation, indicated in the present case, by the numeric character "1". In the figures the alphabetic character is labelled 1 and the numeric character is labelled 2. In an array of several pushbuttons 15, the pushbutton 15 may, for example, together with the one presented include, analogically, all alphabetic characters in the first mode, for example, for keying in selected letters, and in the second mode all figures, for example, for keying in selected numbers and other potential additional symbols as shown in FIG. 7. The first mode of operation and the second mode of operation may include other functions in addition to the alphabet and the figures, for example operations required to use the device. The mode of operation is changed with the pushbutton 16 (FCN).

Figure 1:
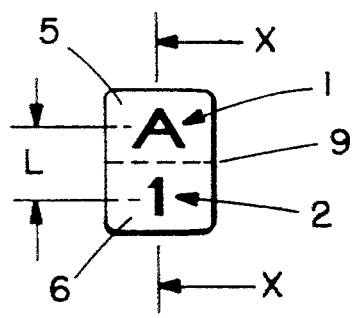
FIG. 1 shows a schematic plan view of a pushbutton of a first embodiment of the invention.
Figure 3A:
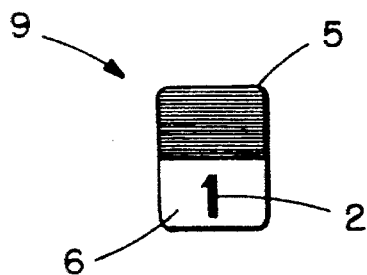
FIGS. 3a and 3b show the pushbutton of FIG. 1 in two different modes of operation.
Figure 3B:
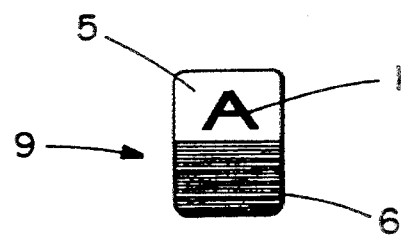
Figure 4A:
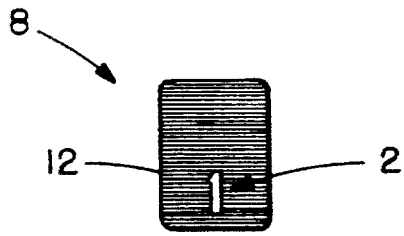
FIGS. 4a and 4b show the pushbutton of FIG. 2 in two different modes of operation.
Figure 4B:
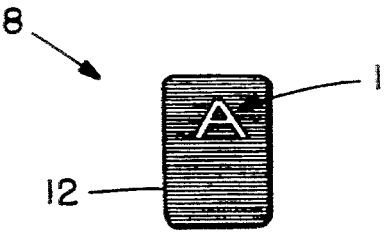
Figure 5:
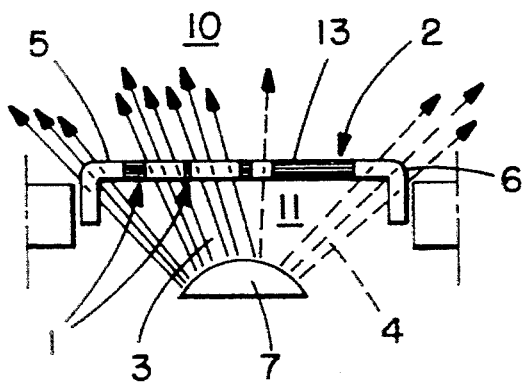
FIG. 5 shows a cross-section of the pushbutton along the line X—X of FIG. 1 with a source of illumination.
Figure 6:
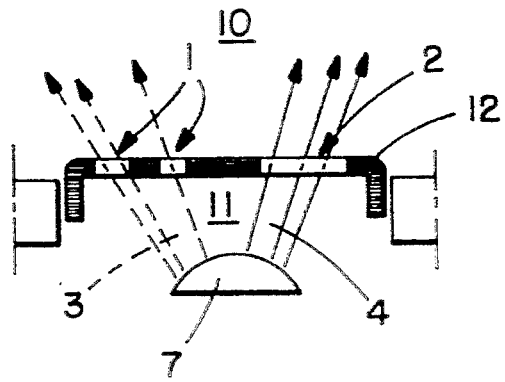
FIG. 6 shows a cross—section of the pushbutton along the line Y—Y of FIG. 2 with a source or illumination.

In the first embodiment of FIG. 1 a pushbutton 9 comprises a translucent, coloured first area 5, the colour of which denotes the first mode of operation, having an opaque symbol "A" thereon indicative of the function of this pushbutton in this first mode. The other part of %he pushbutton 9 comprises a second translucent coloured sea 6 the colour of which denotes the second mode of operation, having an opaque symbol "1" thereon indicative of the function of this pushbutton in the second mode. The symbol "A" and the area 5 and the symbol "1" and the area 6 are positioned adjacent one another on the pushbutton 9. The pushbutton 9 contains internal pushbutton keyboard illumination, as shown in FIG. 5, provided by a light source 7, for example, a bicoloured LED (Light Emitting Diode). The light source 7 emits, selectively, light of a third colour or light of a fourth colour, as shown schematically in FIG. 5 by whole lines 3 and broken lines 4 respectively. This light source 7 is located below the underside 11 of the pushbutton 9, the pushbutton being viewed by the user from the outside 10. The two wavelengths of the light ie. that of the third and fourth colours, and the materials of the pushbutton 9 are selected such that the wavelength absorption of the transparent areas 5 and 6 are such that the light of the third colour is transmitted through the first area 5, but not the second area 6, while the light of the fourth colour is transmitted through the second area 6, but not the first area, 5. It goes without saying that this light source 7 emits both colours over the surface of the entire pushbutton independent of the colour. When the pushbutton 9 and at the same time its light source 7 have been coupled either using a function key 16 (in the instance of a radio telephone) or, as a result of the logical operation of the pushbutton keyboard, so as to select the second pushbutton mode of operation, the light source 7 emits the light of the fourth colour, which is transmitted through the second area 6 but not the first area 5. As a result the operator sees the first area 5 black or at least very dark and the second area 6 illuminated relatively brightly. In this case the symbol "A" on the area 5 cannot be distinguished, whereas in the area 6 the symbol "1" can be seen clearly. The symbol "1" is the one which corresponds to the second pushbutton function presently in operation, and this is illustrated in FIG. 3a. If, instead, the pushbutton 9 and, at the same time, the light source 7 are coupled so to select the first pushbutton mode of operation, the light source 7 emits the light of the third colour which is transmitted through the first area 5, but not the second area 6, whereby the first area 5 appears to the user as being relatively brightly illuminated and the second area 6 black or dark. In this case, the symbol "A" corresponding to the first pushbutton function can be distinguishable in the first area 5, whereas no symbol is visible in the second area 6 as illustrated in FIG. 3b.

Figure 2:
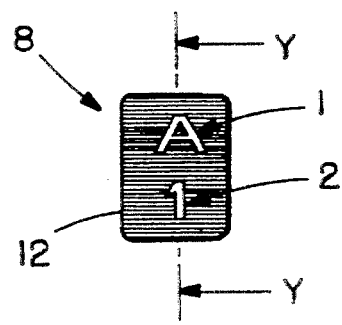
FIG. 2 shows a schematic plan view of a pushbutton of a second embodiment of the invention.

FIGS. 2, 4a and 4b, and 6 illustrate a second embodiment of the pushbutton according to the invention, its design being the reverse to the one described above. In this case, the pushbutton 8 comprises a mainly opaque material 12 having a first translucent symbol 1 thereon indicative of the pushbutton function when in a first mode of operation, the translucent symbol 1 being made of a first material having a colour denoting the first pushbutton operation, and a second translucent symbol 2 thereon indicative of the pushbutton function when in a second mode of operation, the second translucent symbol 2 being made of a second material having a colour denoting the second pushbutton operation. The symbols 1, 2, which in the present case are similarly represented by the characters "A" and "1" as in FIG. 1, have in each case been placed on the pushbutton 8 relative to one another, as illustrated in FIG. 2. The pushbutton 8 also comprises a light source 7 emitting, selectively, light of a third colour and light of a fourth colour, as shown schematically in FIG. 6 by dotted lines 3 and whole lines 4 respectively.

As with the first embodiment, the two wavelengths of the emitted light and the materials of the translucent symbols are selected such the wavelength absorption of the translucent areas are such that light of the third colour is transmitted through the first symbol 1, but not the second symbol 2, while light of the fourth colour is transmitted through the second symbol 2 but not the first symbol 1.

Thus, when the light source 7 has been selected to operate in the second pushbutton mode of operation, it emits light of the fourth colour towards the underside 11 of the entire pushbutton 8, whereby the emitted light is transmitted through the second symbol 2 but not the first symbol 1. As a result, the operator sees the pushbutton as in FIG. 4a, i.e. the number "1" is clearly lit while the rest of the pushbutton 8 looks black or dark. If instead, the light source 7 is selected to operate in the first mode of operation, it emits light of the third colour, which is transmitted through the first symbol but not the second symbol 2, such that the user viewing from the outside 10, sees the letter "A" clearly lit, whereas the rest of the pushbutton is black or dark.

Thus, only the symbol relating to the selected mode of operation is visible for each pushbutton, and the symbols relating to other modes of operation cannot be seen by the operator until the pushbuttons are switched to those other modes. When the mode of operation of the pushbuttons is changed, e.g. using the function key 16, the function key 16 may be illuminated as described above, i.e., by a function symbol denoting a first mode of operation, and a function symbol demoting a second mode of operation, equally as described above. The function key 16 is similarly provided with a light source 7 as described above. The difference from the embodiment described above is that the power is maintained in the light source 7 of the function key so that it emits simultaneously both the light of the third colour and the light of the fourth colour, such that both symbols are visible in different colours at the same time. This assists in observing the function key. Another alternative would be to illuminate the symbol denoting of the mode of operation which is not in use or which will be next in succession. This indicates clearly the change in the mode of operation to be implemented by the subsequent use of the function key. It is also possible to use a function key provided only with one symbol and one colour, as in the pushbutton keyboard 14 of the radio telephone of FIG. 7 because the function keys demonstrate, in themselves, the mode of operation.

The above mentioned bicoloured light emitting diode 7 can be substituted by two LED each emitting a different colour, or by two electroluminescence elements (EL element ) each emitting a different colour, these being placed side by side at a suitable point or at a distance which is equivalent to the distance, L, of the symbols from each other, as shown in FIG. 1. The colours emitted selectively by the two LED or by the electroluminescence elements are the third and fourth colours. Alternatively, the lighting for the entire pushbutton keyboard may be arranged by means of a bicoloured LED or two single-colour LEDS common thereto, and by providing the pushbutton keyboard with light guides, such as optical fibres, which transport the emitted light to each pushbutton. It is also conceivable that some of the pushbuttons may be illuminated by means of a common LED and common light guides, while one or some of the pushbuttons by LEDS of their own in order to denote the modes of operation independently of one another. When two different LEDS are used in each pushbutton or when light is derived from two different common LEDS, the light beams can to some extent be focussed to the area in which the light is supposed to transmit because of its colour.

The pushbuttons may denote a greater number of modes of operation than the two mentioned above, for instance three modes. In that case, the surface of the pushbutton has a third area, having a symbol thereon indicative of the function of the pushbutton in this mode of operation, and made either of a translucent material of a different colour or an opaque symbol located in the area made from this material, as described above. A second or a third LED is used for emitting light of another colour, which cannot be transmitted through the earlier described areas, but may be transmitted through the area of the different colour, but which on the other hand is not capable of transmitting the lights of the third or the fourth colour.

A light source other than a LED or LEDS can be used, for example electroluminescent elements of similar type as those used for background light. In principle, filament lamps may also be used for illumination by employing appropriate filters, before the lamps or a photoconductor, of, for example colours denoting the modes of operation. Also other light sources, such as semiconductor lasers, are conceivable. However, the LEDS and EL elements mentioned at the beginning are advantageous owing to their low power consumption with these, sufficiently limited emission bands in a clearly visible wavelength area can be provided so as to produce the emphasis of the invention when using filters of approximately the same transmission bands in coloured areas.

Translucent, as used in this specification, includes transparent, and the terms are used interchangeably.

The transparent coloured parts may be made of a bright or diffusive transparent material such as plastic or laminates made therefrom, and so on. In particular, if the coloured parts are made such that the underside 11 facing the light source 7 is made of a light transmitting but diffusing non-colouring material which in the reflective light looks white, and upon which is placed a film of bright colour, or such that it is made of a coloured diffusing material which transmits and diffuses light, the symbol appears without any internal illumination to have colour in external lighting. In this situation the pushbutton keyboard looks the same as any pushbutton keyboard provided with symbols distinguishable by colour.

The symbols may be shaped on the pushbuttons in any manner known themselves in the art if the above described properties are formed.

One more opportunity is to use reflective colours on a non-transparent base for the symbols. For example, bicoloured illumination may be provided as described above, but focussed from the top onto the symbols, in which one wavelength of the light is reflected from the symbols indicative of one mode of operation, but is absorbed by symbols indicative of the other modes of operation, the same effect is created both in the internal illumination and external illumination as described above.

Figure 8:
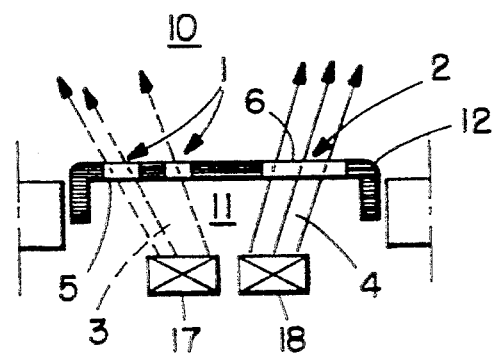
FIG. 8 shows a schematic cross-sectional view of an alternate embodiment of the invention.
Figure 9:
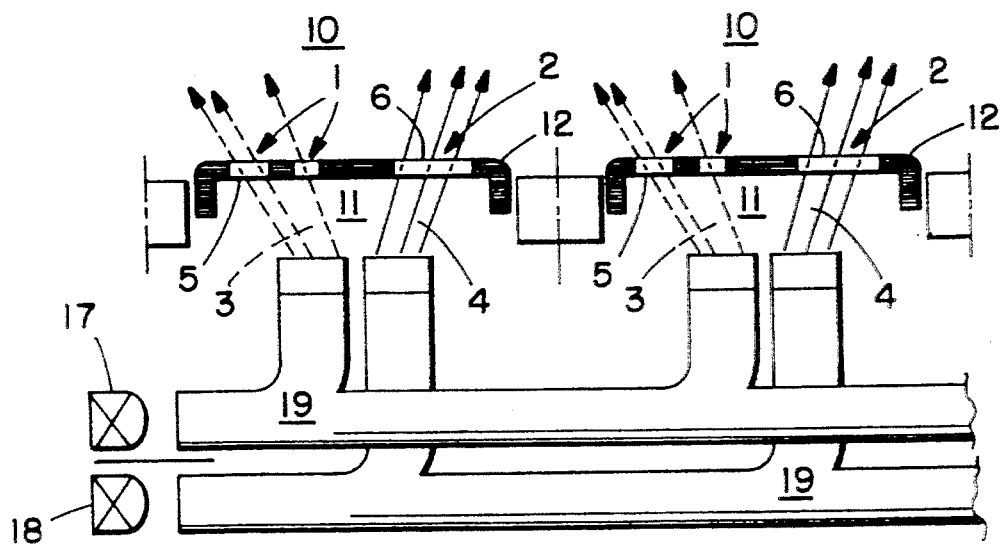
FIG. 9 shows a schematic cross-sectional view of an alternate embodiment of the invention.
Figure 10:
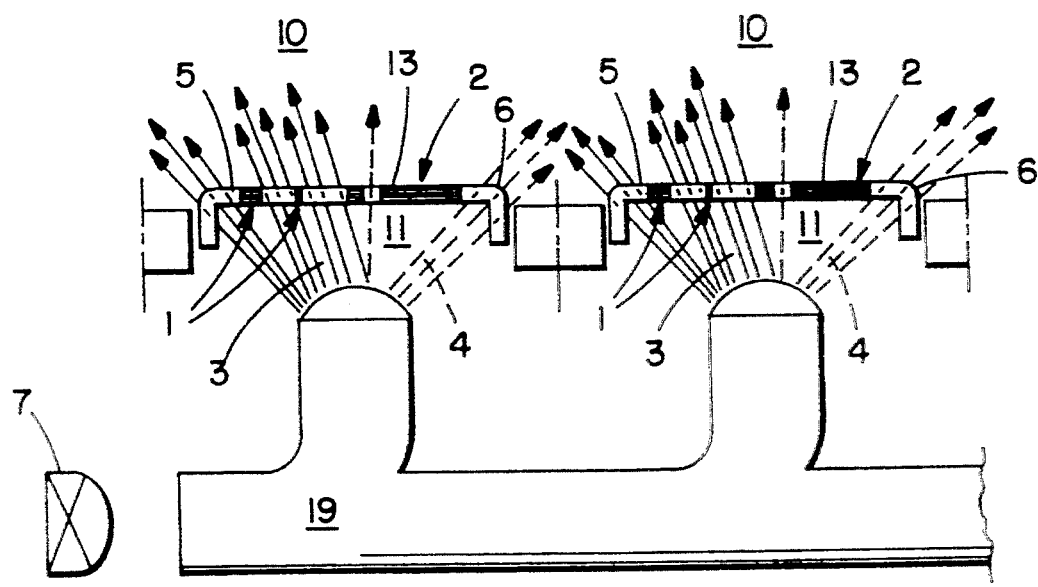
FIG. 10 shows a schematic cross-sectional view of an alternate embodiment of the invention.
Figure 11:
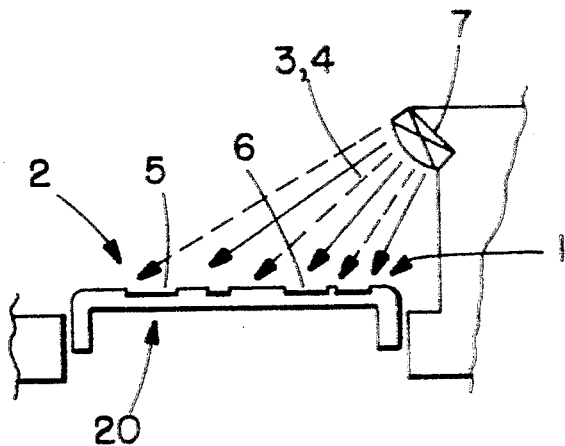
FIG. 11 shows a schematic cross-sectional view of an alternate embodiment of the invention.
Figure 12A:
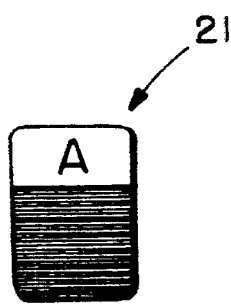
FIGS. 12A–12C shows a pushbutton illuminated in three different modes of operation.
Figure 12B:
Figure 12C:
Figure 13:
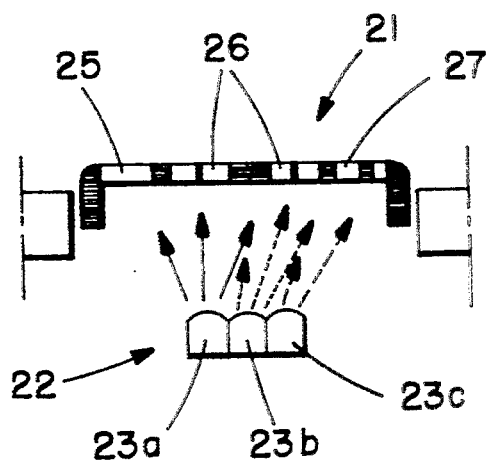
FIG. 13 shows a schematic cross-sectional view of an alternate embodiment of the invention.

FIGS. 8–13 show various different alternate embodiments where like numbers are used to represent similar elements as those shown in FIGS. 1–7. In FIG. 8, an alternate embodiment is shown that has two light emitters 17, 18. Each light emitter is adapted to emit light of a different colour. In FIG. 9 a keyboard is shown that has the two light emitters 17, for transmitting light from the light emitters 17, 18 to the keys. In FIG. 10 a similar keyboard is shown with the multi-colour emitting emitter 7 and a single light conductor 19. FIG. 11 shows an alternate embodiment where the light emitter 7 is located above the key 20. The first area 5 is adapted to reflect light of the third colour, but absorb light of the fourth colour. The second area 6 is adapted to reflect light of the fourth colour, but absorb light of the third colour. FIGS. 12A–12C show a key 21, similar to the key 9 in FIGS. 3A and 3B, adapted to signal three symbols for use in three different modes of operation. FIG. 13 shows a schematic cross-section view of the keyboard using the key 21 with a light source 22 having three light emitters 23a, 23b, 23c. Each light emitter 23a–23c is adapted to emit a different coloured light. The key 21 has three separate areas 25, 26, 27. Each area 25, 26, 27 is capable transmitting light of only one of the colours therethrough.

I claim:

1. An internally illuminated keyboard comprising: a plurality of keys including a first key operable in at least two different modes, the different modes being marked by spaced symbols distinguished from one another by different colors, a first one of the symbols being in a first area comprising a first material with a first one of the colors, and a second one of the symbols being in a second area comprising a second material with a second one of the colors; and a light source located below the first key, the light source being adapted to emit light of a third color and light of a fourth color;

wherein the first and second areas are located side-by-side and the light source emits light at the spaced symbols simultaneously and, the first material transmits light of the third color therethrough but substantially blocks transmission of light of the fourth colour therethrough, and the second material transmits light of the fourth color therethrough but substantially blocks transmission of light of the third colour therethrough.

2. A keyboard according to claim 1 wherein the first and second areas comprise the first and second symbols being comprised of the first and second materials, respectively, and the symbols are surrounded by non-light transmitting material.

3. A keyboard according to claim 1 wherein the first and second areas comprise the first and second symbols being comprised of non-light transmitting material, and the symbols are surrounded by the first and second materials, respectively.

4. A keyboard according to claim 1 wherein the keyboard has a plurality of the first keys operable in the at least two different modes and a plurality of the light sources, a separate one of the light sources being located under each of the first keys.

5. A keyboard according to claim 1 wherein the light source has two light emitters comprising a first light emitter for emitting light of the third color and a fourth light emitter for emitting light of the fourth color.

6. A keyboard according to claim 5 wherein the first and second light emitters are located below the first and second symbols, respectively.

7. A keyboard according to claim 1 wherein the light source comprises at least one light emitter and at least one fiber optic light conductor.

8. A keyboard according to claim 7 wherein the light emitter is spaced from the first key and the fiber optic light conductor is located between the light emitter and the area below the first key to transmit light from the light emitter to the area below the first key.

9. A keyboard according to claim 1 wherein the plurality of keys includes at least one function key for selecting the mode of operation of the first key.

10. An illuminated keyboard comprising:
operation keys operable in at least two different modes, at least one of the operation keys having at least two separate side-by-side areas for signalling the modes of operation for that key, a first one of the areas comprising a first material and having a first symbol, and a second one of the areas comprising a second material and having a second symbol;
a light source for directing light to both of the first and second areas simultaneously, the light source being adapted to emit at least two different colors of light; and
a function key for switching the different modes of operation of the operation keys and for causing the light source to switch between emitting the different colors of light.

11. A keyboard according to claim 10 wherein the first material has a first color, the second material has a second colour, and the light source is adapted to emit light of a third color and a fourth color.

12. A keyboard according to claim 11 wherein the first material reflects light of the fourth color, but absorbs light of the third color, and the second material reflects light of the third color, but absorbs light of the fourth color.

13. A keyboard according to claim 12 wherein the light source is located above the symbols and simultaneously illuminates all of the symbols.

14. A keyboard according to claim 10 wherein at least some of the operation keys are operable in at least three different modes and have at least three separate areas for signaling the modes of operation for that key with a third one of the areas comprising a third material and having a third symbol.

15. A keyboard according to claim 14 wherein the light source is adapted to emit at least three different colors of light.

16. A keyboard according to claim 15 wherein the first, second and third materials of the separate areas each block transmission of two of the three different colors of light therethrough.

17. A keyboard according to claim 15 wherein the first, second and third materials of the separate areas each transmit only one of the three different colors of light therethrough.

* * * * *